United States Patent [19]

Yamakawa

[11] Patent Number: 4,500,492
[45] Date of Patent: Feb. 19, 1985

[54] APPARATUS AND METHOD TO KEEP THE WALLS OF A FREE-SPACE REACTOR FREE FROM DEPOSITS OF SOLID MATERIALS

[75] Inventor: Kazuo A. Yamakawa, Monterey Park, Calif.

[73] Assignee: The United States of America as represented by the Administrator of the National Aeronautics and Space Administration, Washington, D.C.

[21] Appl. No.: 415,879

[22] Filed: Sep. 8, 1982

[51] Int. Cl.³ .............................. B08B 5/02; C09C 1/28
[52] U.S. Cl. ...................................... 422/199; 15/406; 134/37; 422/129
[58] Field of Search ............... 422/150, 158, 107, 112, 422/210, 129, 199; 15/300 R, 345, 359, 405, 406; 134/2, 37, 39, 70, 173

[56] References Cited

U.S. PATENT DOCUMENTS

| | | | |
|---|---|---|---|
| 1,772,984 | 8/1930 | Crommett | 422/158 X |
| 2,986,451 | 5/1961 | Wilson et al. | 423/349 |
| 3,001,335 | 9/1961 | Lovely . | |
| 3,391,998 | 7/1968 | Groves et al. | 422/158 X |
| 3,522,016 | 7/1970 | Groves et al. . | |
| 3,550,177 | 12/1970 | Darr et al. . | |
| 3,635,901 | 1/1972 | Urgesi et al. . | |
| 3,835,910 | 9/1974 | Westphal . | |
| 3,836,434 | 9/1974 | Novy | 134/39 X |
| 3,848,289 | 11/1974 | Bachmann . | |
| 4,026,701 | 5/1977 | Till et al. | 134/37 X |
| 4,210,976 | 7/1980 | Apelt et al. . | |
| 4,242,311 | 12/1980 | Middaugh | 422/302 |

Primary Examiner—Barry Richman
Assistant Examiner—William R. Johnson
Attorney, Agent, or Firm—Paul F. McCaul; Thomas H. Jones; John R. Manning

[57] ABSTRACT

An apparatus (21) and method is disclosed for keeping interior walls (28) of a reaction vessel (22) free of undesirable deposits of solid materials in gas-to-solid reactions. The apparatus (21) includes a movable cleaning head (36) which is configured to be substantially complementary to the interior contour of the walls (28) of the reaction vessel (22) and which is disposed in close proximity to the walls (28). The head (36) ejects a stream of gas with a relatively high velocity into a narrow space between the head (36) and the walls (28), and in accordance with Bernoulli's principle the head (36) is biased towards the walls (28) by the pressure prevailing in the reaction vessel (22). The gas ejected from the head (36) is of such composition that it does not participate significantly in the chemical reaction conducted in the reaction vessel (22). The head (36) is moved substantially continuously to at least intermittently blow the stream of gas to substantially the entire surface of the walls (28) wherein undesirable solid deposition is likely to occur. The disclosed apparatus and process is particularly useful for keeping the walls (28) of a free-space silane-gas-to-solid-silicon reactor (22) free of undesirable silicon deposits.

10 Claims, 6 Drawing Figures

APPARATUS AND METHOD TO KEEP THE WALLS OF A FREE-SPACE REACTOR FREE FROM DEPOSITS OF SOLID MATERIALS

The invention described herein was made in the performance of work under a NASA Contract and is subject to the provisions of Section 305 of the National Aeronautics and Space Act of 1958, Public Law 85-568 (72 STAT 435; 43 USC 2457).

BACKGROUND OF THE INVENTION

1. Field of the Invention

The present invention is broadly directed to an apparatus and method for keeping the walls of a reactor free of deposits of a solid reaction product formed in a chemical reaction of a precursor gas composition. More particularly, the present invention is directed to an apparatus and method for keeping the walls of a silicon-producing free-space reactor free of undesirable deposits of crusts of silicon.

2. Brief Description of the Prior Art

There are several chemical processes wherein a solid substance is produced by chemical reaction of a suitable precursor gas composition. For example, solid titanium dioxide (an important pigment) is produced on an industrial scale by vapor phase oxidation of titanium halide.

More importantly from the standpoint of the present invention, the process for producing elemental silicon of sufficient purity for semiconductor and solar cell manufacture also involves vapor phase thermal reaction of a suitable precursor gas. As is known in the art, the manufacture of solar cells requires a relatively large amount of silicon. However, because of the severe problems associated with the large-scale production of semiconductor or solar cell grade (hereinafter solar grade) silicon, state-of-the-art processes are, generally speaking, incapable of providing solar grade silicon at a reasonable cost. In fact, the unavailability of solar grade silicon at a reasonable cost represents the principal factor which presently still renders solar cells too expensive for large-scale electrical power generation.

More particularly, state-of-the-art processes for solar grade silicon production involve the vapor phase thermal reaction of a volatile silicon compound such as silicone tetrachloride ($SiCl_4$), or trichlorosilane ($SiHCl_3$) with hydrogen ($H_2$) gas to yield solid silicon and hydrogen chloride (HCl) gas. A presently preferred method for solar grade silicon production utilizes the thermal decomposition of silane ($SiH_4$) gas to solid silicon (Si) and hydrogen ($H_2$) gas, in accordance with Equation I.

$$SiH_4 \xrightarrow{heat} Si + 2H_2 \qquad \text{Equation I}$$

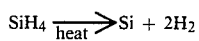

In accordance with one well-accepted method of the prior art, the silicon-producing thermal reaction is conducted in a reactor containing a plurality of heated silicon rods whereby the newly-formed silicon epitaxially grows on the crystalline surface of the rods. A disadvantage of this process is that the newly-formed silicon must be periodically removed from the surfaces of the rods.

A relatively recently developed apparatus for production of solar grade silicon makes use of the thermal decomposition reaction shown in Equation I, in a "free space" reactor. More particularly, in this apparatus, silane gas is introduced into a cylindrical reactor, the side walls of which are heated. Ideally, solid silicon forms as a powder which is periodically removed from the reactor through a suitable state-of-the-art "hopper" or like equipment.

Although the "free-space" reactor offers significant promise for relatively economical solar grade silicon production, it presently suffers from a major disadvantage in that the newly-formed silicon tends to deposit in the form of a hard crust on the heated side walls of the reactor. As is well appreciated by those skilled in the art, significant build-up of a silicon crust on the walls of the reactor is incompatible with the continuous and efficient operation of the reactor; primarily because the crust changes the temperature profile of the reactor as it builds up.

Various scraping devices were tried in the prior art in an attempt to continuously or intermittently remove the deposited crust of silicon from the walls of the free-space reactor. For example, a steel ring was continuously or periodically moved up and down in contact with the internal walls of the reactor. However, these prior art "scraping" devices were by-and-large unsuccessful. This was mainly because they tended to contaminate the produced silicon to the extent that the silicon became less suitable or unsuitable for solar cells and semiconductor manufacture.

The present invention is designed to alleviate the above-noted problem and render the operation of the "free-space" silicon-producing reactor continuous and efficient. More broadly, the present invention is applicable to chemical processes wherein a gas phase reaction yields a solid product which tends to build up as an undesirable deposit on the walls of the reactor.

For the state-of-the-art relating to scraping and stirring devices generally used in the chemical, food processing and related industries, reference is made to U.S. Pat. Nos. 4,210,976; 3,550,177; 3,848,289; 3,522,016; 3,001,335; 3,635,901 and 3,835,910. The apparatus disclosed in the above-referenced patents are, broadly speaking, devices wherein rotating scraper blades contact the walls of a reactor, container or crucible to remove solid or pasty material therefrom.

SUMMARY OF THE INVENTION

It is an object of the present invention to provide an apparatus and method for efficiently keeping the walls of a reaction vessel free from solid material formed in a gas-to-solid chemical reaction which is conducted in the vessel.

It is another object of the present invention to provide an apparatus and method particularly adapted for facilitating production of solar and semiconductor grade silicon in a free-space reactor wherein the silicon is formed by thermal reaction of a suitable precursor gas composition.

It is still another, more particular object of the present invention to provide an apparatus for inhibiting formation of a silicon crust or deposit on the walls of a free-space reactor wherein silane gas is thermally decomposed to form silicon suitable for semiconductor and solar cell manufacture.

These and other objects and advantages are attained by an apparatus having a movable member mounted within the interior of a reaction vessel wherein a gas-to-solid chemical reaction and particularly silane-to-silicone thermal decomposition occurs. The movable member is configured to be substantially complementary to the contour of interior walls of the vessel, and is adapted to eject a stream of gas in close proximity to the wall.

The stream of gas is of such composition or temperature that it does not significantly participate in the chemical reaction occurring in the vessel. The movable member is biased towards the wall, either by the interior pressure of a telescoping mounting assembly which carries the member, or by other suitable biasing means. The stream of gas ejected from the member lowers the static gas pressure in a narrow space between the member and the wall of the vessel, whereby the member is further biased into very close proximity of the wall by internal gas pressure prevailing in the vessel.

The member, or a plurality of members ejecting the stream of gas in the above-described manner, are substantially continuously moved in the vessel to substantially cover all areas of the interior walls where deposit of the solid substance is likely to occur. In the silane-to-silicon conversion the moving members substantially cover all heated areas of the reactor wall. The ejected gas stream combined with occasional physical scraping action of the member on "high spots" of deposited substance, efficiently keep the walls free of deposits of the solid substance.

The features of the present invention can be best understood, together with further objects and advantages, by reference to the following description, taken in connection with the drawings, wherein like numerals indicate like parts.

BRIEF DESCRIPTION OF THE DRAWINGS

FIG. 6 is a partial cross-sectional view of a fourth preferred embodiment of the reactor apparatus of the present invention, the view showing a gas ejecting member which includes a scraping edge for physical contact with a wall of the reactor.

DESCRIPTION OF THE PREFERRED EMBODIMENTS

The following specification taken in conjunction with the drawings sets forth the preferred embodiment of the present invention. The embodiments of the invention disclosed herein are the best modes contemplated by the inventor for carrying out his invention, although it should be understood that various modifications can be accomplished within the parameters of the present invention.

Figure 1:
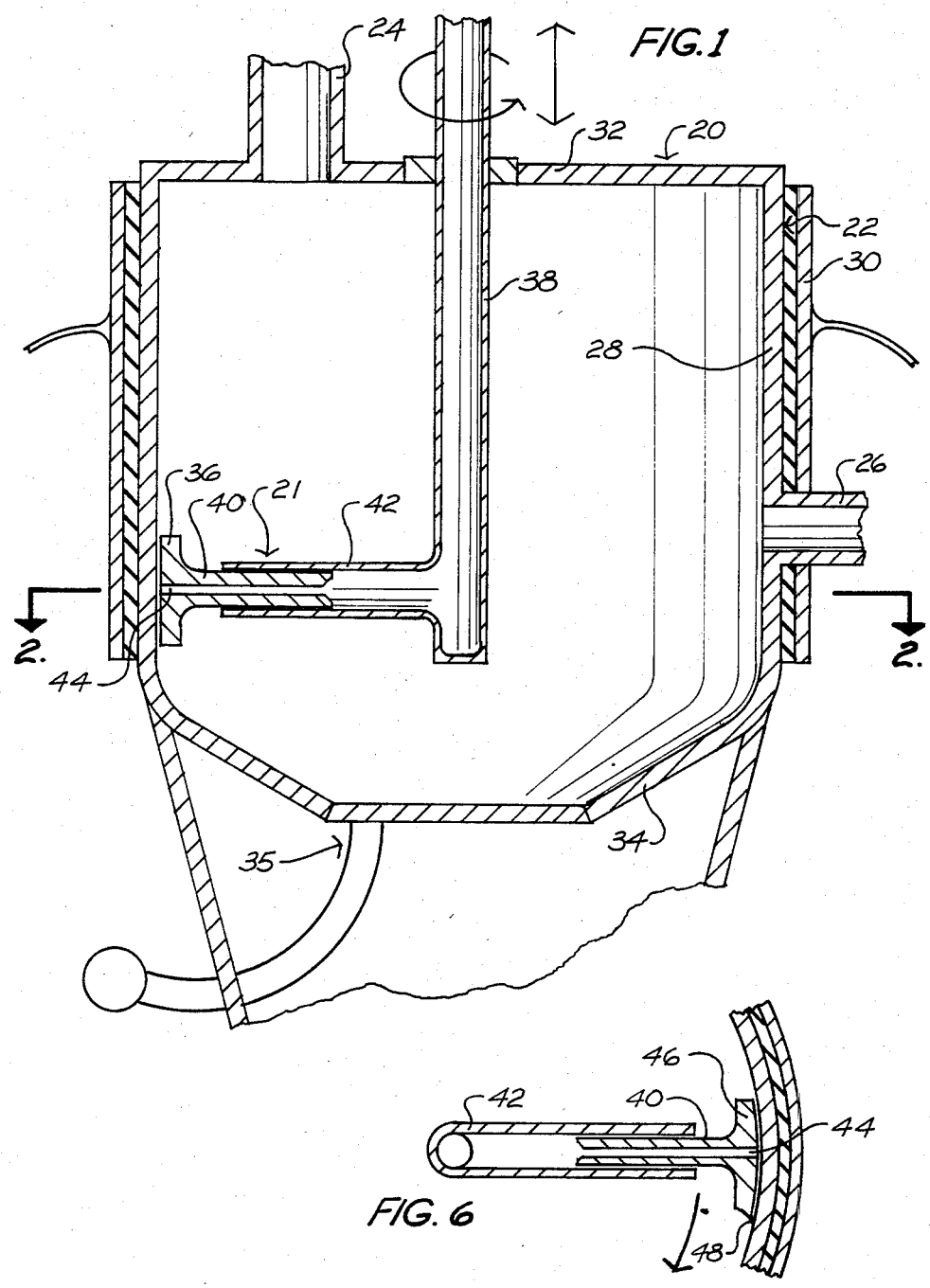
FIG. 1 is a schematic, cross-sectional view showing a first preferred embodiment of the reactor apparatus of the present invention.
Figure 2:
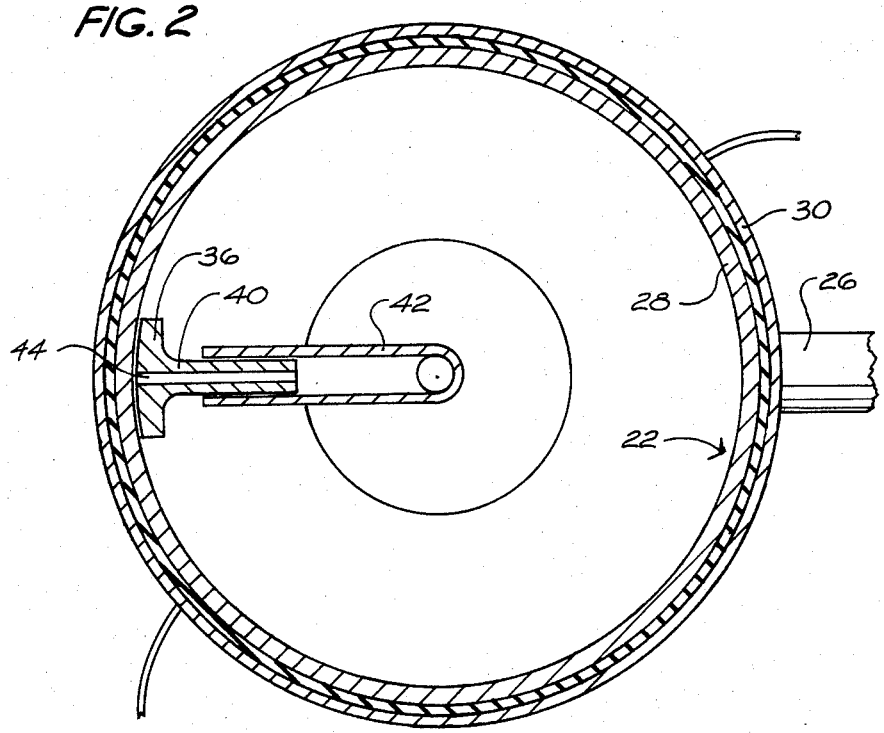
FIG. 2 is another schematic, cross-sectional view of the first preferred embodiment, the cross-section being taken on lines 2,2 of FIG. 1.

Referring now to FIGS. 1 and 2, a reactor apparatus 20 is disclosed, wherein the first preferred embodiment of a novel assembly 21 for keeping walls of a reactor vessel 22 free of deposited solid material, is utilized.

It should be noted at the outset of the present description, that the novel wall cleaning assembly 21 of the present invention is broadly useful and adaptable for application in practically any chemical process wherein a solid substance is produced in a reaction vessel from a precursor gas composition. However, in light of the current special importance of solar cell and semiconductor grade silicon production, the novel apparatus and process of the present invention is particularly adapted for the silane-gas-to-solid-silicon thermal decomposition process as practiced in a free-space reactor in accordance with Equation I. Equation I is set forth in the introductory section of the present application for patent. Therefore, the invention is hereinafter described in an exemplary manner with reference to the silane-to-solid-silicon process and the free-space reactor or reaction vessel 22.

Thus, the novel reactor apparatus 20 includes a substantially conventional reaction vessel or reactor 22, which is schematically shown on FIGS. 1 and 2. The reactant gas composition is introduced into the vessel 22 through an inlet tube 24. By-product gases and/or excess or unreacted reactant gas composition is allowed to escape from the reactor 22 through a by-product gas outlet tube 26. Flow-control valves which may be incorporated in the inlet tube 24 and outlet tube 26 in accordance with state-of-the-art are not shown on the schematic views of the drawing figures.

In the herein-described specific example of the silane-to-solid-silicon process, the reactant gas is silane ($SiH_4$), or silane diluted with hydrogen ($H_2$), and the by-product gas is hydrogen ($H_2$).

As is indicated in Equation I, decomposition of silane to yield silicon and hydrogen is a thermal reaction, which proceeds substantially to completion at temperatures of approximately 700° C. or higher. Therefore, the interior of the reactor 22 is heated to approximately 700° C. or higher temperatures.

Heating of the reactor 22 is accomplished in accordance with the state-of-the-art. For example, suitable resistance heaters, schematically shown on the drawing figures and bearing the reference numeral 30, surround the side walls 28 of the reactor 20. As is shown, it is customary in the art to heat only the side walls 28 of the free-space reactor 22 in order to substantially avoid undesirable deposition of a crust of silicon on top and bottom walls, 32 and 34 respectively, of the reactor 22. As it is further explained below, this results in potential silicon crust deposition only on portions of the sidewalls 28, where the deposition is effectively prevented, and any inadvertent deposit is effectively removed by the novel assembly 21 of the present invention.

The walls 28, 32 and 34 of the silicon-producing free-space reactor are customarily made of quartz, or at least the reactor 22 has an interior quartz lining. Of course, the material of the reactor walls is not critical from the standpoint of the present invention. Rather the requirements for the material of the reactor walls is dictated by the nature of the chemical process which is conducted in the reactor. For production of solar and semiconductor grade purity silicon, the principal requirement is that the produced silicon not be contaminated by the walls of the reactor, and that the walls be capable of withstanding prolonged exposure to the reaction conditions prevailing in the reactor 22. Experience has shown that quartz satisfies these requirements.

The silicon produced in the reactor 22 is normally in the form of relatively voluminous particles which settle in the bottom of the reaction vessel 22. The accumulated silicon product (not shown) is then removed from the reactor 22 through a suitable "hopper" or like assembly 35 which is only schematically shown on the drawing FIGS. 1 and 3.

A typical free-space reactor for silicon production is approximately 0.5 meter in diameter and its length usually measures 1.5 to two times its diameter. However, it should be understood that significantly larger, and somewhat smaller free-space reactors may be constructed for silicon production. Furthermore, in other chemical processes where the present invention may be utilized, the dimensions of the reactor may differ substantially from the above-noted exemplary dimensions.

Referring still principally to FIGS. 1 and 2, construction of the novel wall cleaning assembly 21 of the present invention is disclosed. Principal features of the wall cleaning assembly 21 include a head 36 which is disposed in close proximity of the interior side walls 28, a gas ejecting aperture or nozzle which emits a stream of gas into the narrow space between the head 36 and side walls 28, and a mechanism which causes the head 28, or a plurality of heads to substantially continuously move in close proximity to the side walls 28. As a result, substantially the entire interior surface prone to solid deposition is at least intermittently subjected to the gas stream.

More particularly, in the herein-described first preferred embodiment a rotatable shaft 38 is disposed substantially in the center of the reaction vessel 22, and the gas stream is conducted within the interior of the shaft 38.

The head 36 is configured to be substantially complementary to the interior contour of the side walls 28 of the reaction vessel 22, as is shown on the cross-sectional view of FIG. 2. The cleaning head 36 is mounted to a first tube or pipe 40 which is telescopically held in a side tube or side arm 42. The side arm 42 is attached to the rotating shaft 38. The head 36 is in fluid communication through the rotating shaft 38 and the tubes 40 and 42 with a source (not shown) of the gas stream.

The gas stream comprises a gas composition which does not participate significantly in the principal chemical reaction occurring in the reaction vessel 22. In other words, the gas stream is preferably inert to the reaction, and dilutes the reactant gas in the immediately proximity of the interior side walls 28 to minimize solid deposition on the side walls 28. In the process of silicon production from silane, the gas stream preferably consists essentially of hydrogen, or an inert gas such as argon. Alternatively, and preferably the gas stream is also of a cooler temperature than the temperature prevailing in the reaction vessel 22 whereby the intensity of the reaction in the narrow space between the head 36 and the interior side wall 28 is further decreased and the tendency of solid silicon to deposit on the side walls 28 is further lessened.

The gas stream is supplied to the head 36 at a pressure which is significantly higher than the gas pressure prevailing in the interior of the reactor 22. In the herein-described exemplary process of silane-to-solid silicon conversion, the prevailing pressure in the reactor 22 is approximately 15 to 20 absolute psi. Therefore the cleaning gas stream is preferably supplied to the head 36 under approximately 40 to 100 psi pressure. Consequently, the gas stream is ejected from the aperture or nozzle 44 of the head 36 at a relatively high velocity. The interior pressure prevailing in the rotating shafts 38 and the tubes 40 and 42 tends to bias the head 36 towards the side walls 28.

Furthermore, the gas stream moves at a high velocity in the narrow space between the head 36 and the side walls 28. Therefore, in accordance with Bernoulli's principle, it reduces the pressure in the narrow space relative to the internal "static" gas pressure prevailing in the reactor 22. Consequently, the internal pressure of the reaction vessel 22 further biases the head 36 towards the side walls 28. It will be readily appreciated by those skilled in the art in light of the foregoing that during operation of the wall cleaning assembly 21 the gap between the head 36 and the side walls 28 is indeed very narrow. The width of the gap is determined by the combined effects of the internal pressure of the reactor 22, the pressure of the gas stream, the shape of the head 36 and size of the aperture or nozzle 44. The latter two, as is appreciated by those skilled in fluid flow mechanics, are principal factors in determining the gas velocity between the head 36 and the side walls 28.

An important feature of the present invention is that the cleaning head 36 moves substantially continuously, and therefore blows the gas stream to all wall surfaces which are prone to receive deposit of a silicon crust. In the herein-described first preferred embodiment of the reactor apparatus 20, this is accomplished by rotating and simultaneously moving the shaft 38 in a reciprocating motion substantially along the longitudinal axis of the reaction vessel 22. A suitable mechanical assembly (not shown) which brings about this motion is constructed in accordance with the state-of-the-art, and is disposed outside of the reactor vessel 22.

Figure 3:
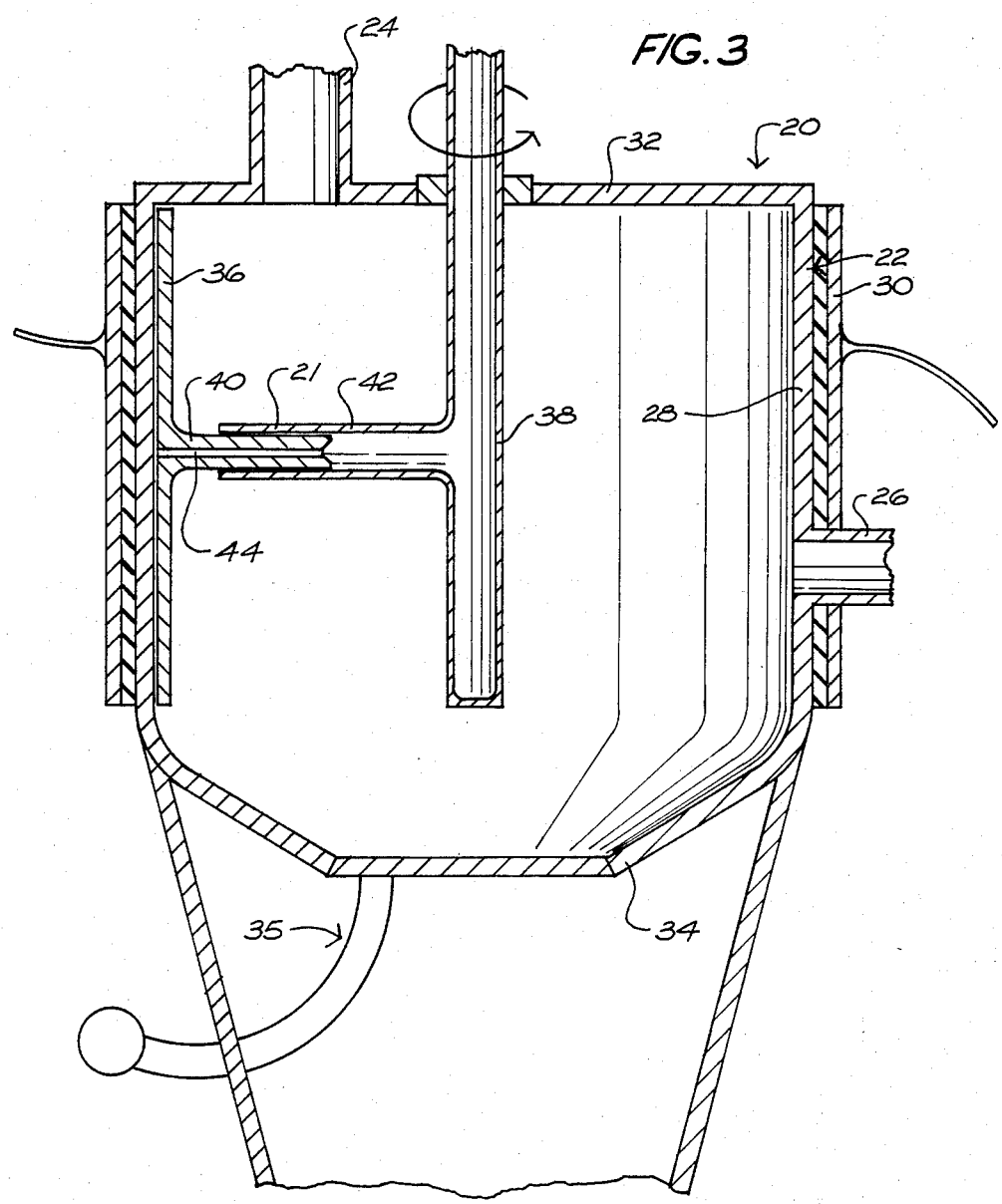
FIG. 3 is a schematic cross-sectional view of a second preferred embodiment of the reactor apparatus of the present invention.

FIG. 3 schematically illustrates a second preferred embodiment of the reactor apparatus 20 and particularly of the novel wall cleaning assembly 21 of the present invention. In this embodiment, a single cleaning head 36 is sufficiently large to substantially cover during its rotating motion the entire interior surface of the side walls 28 where otherwise deposition of a silicon crust would be likely to occur.

Figure 4:
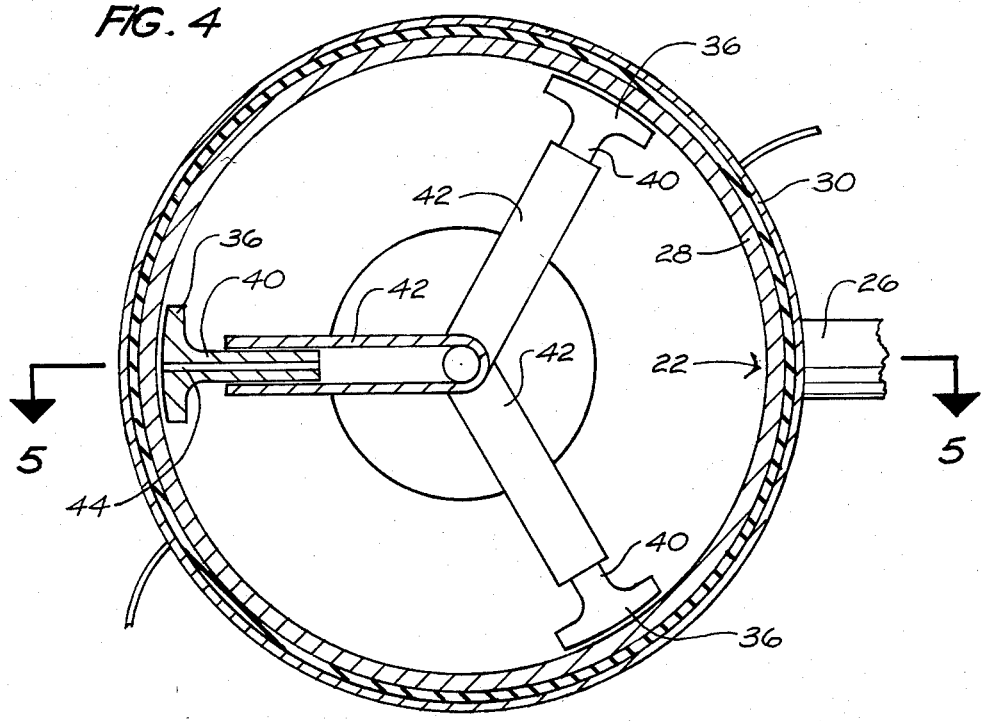
FIG. 4 is a schematic cross-sectional view of a third preferred embodiment of the reactor apparatus of the present invention.
Figure 5:
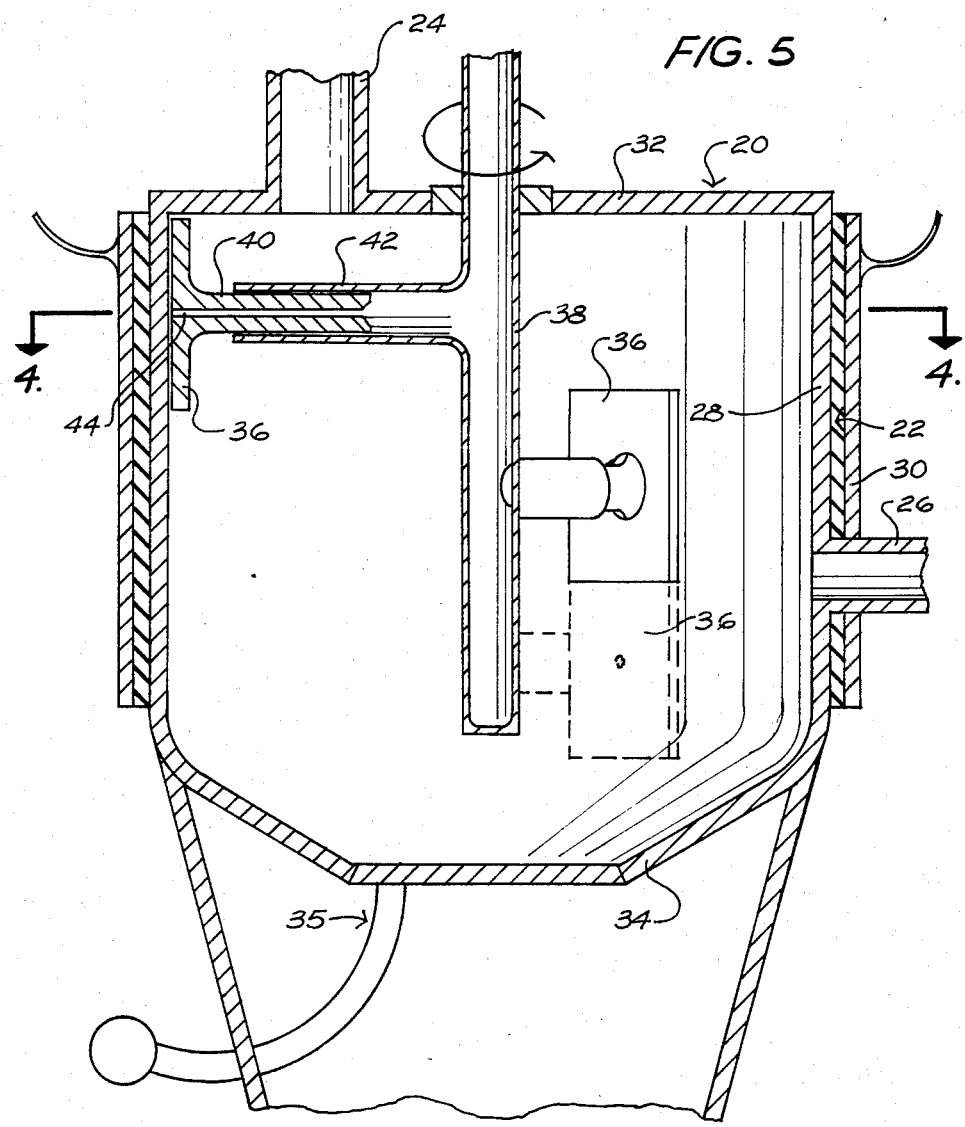
FIG. 5 is another schematic, cross-sectional view of the third preferred embodiment, the cross-section being taken on lines 5,5 of FIG. 4.

FIGS. 4 and 5 illustrate a third preferred embodiment of the novel wall cleaning assembly of the present invention, wherein three (3) cleaning heads 36 of the type described in connection with the first preferred embodiment are mounted on a rotating shaft 38. The arms or tubes 42 connecting the heads 36 to the shaft 38 are spaced at approximately 120° from one another as is shown on FIG. 4. Furthermore, the respective arms 42 are substantially evenly spaced along the longitudinal axis of the shaft 38, as is shown on FIG. 5. Consequently, the heads 36, in their combined effect, are capable to cover substantially the entire interior surface of the heated side wall 28 of the cylindrical reaction vessel 22.

The material of the shaft 38, tubes 40 and 42 and of the heads 36 is preferably quartz in all embodiments of the novel wall cleaning assembly 21 of the present invention when said assembly 21 is used in a reactor apparatus 20 for producing solar or semiconductor grade silicon. This is dictated principally by the requirement that, for solar cell and semiconductor fabrication, the produced silicon must be very pure.

Other chemical processes utilizing the novel wall cleaning assembly 21 of the present invention may have different material requirements. Generally speaking the shaft 38, head 36 and connecting tubes or arms 40 and 42 may be made of the same materials as the reactor walls, just as prior art stirring blades and like devices are made pursuant to the requirements of the particular chemical process conducted in the reactor.

Referring now to the partial view of FIG. 6, a wall cleaning head 46 of a fourth preferred embodiment of the cleaning assembly 21 of the present invention is shown. The wall cleaning head 42 of the fourth preferred embodiment differs from the herein-before-disclosed embodiments only in that the head 46 includes a scraping member 48. The scraping member 48, configured as a leading edge of the head 46, is disposed to be in substantially permanent physical contact with the interior side walls 28. Consequently, the rotating head 46 physically scrapes the walls 28 of the reactor 22, while the assembly also prevents deposition of a silicon crust by the blowing action of the ejected gas stream.

A principal advantage of all embodiments of the hereinabove-described novel wall cleaning assembly 21 is that the assembly efficiently eliminates undesirable deposits of solid materials in reactor walls in gas-to-solid chemical processes. As it should be apparent from the foregoing, this is accomplished by the blowing action of the substantially nonreactive high velocity gas stream and by at least occasional physical contact of the cleaning head 36 or heads with "high spots" of deposited solid material.

Since several modifications of the above-described invention may become readily apparent to those skilled in the art in light of the above disclosure, the scope of the present invention should be interpreted solely from the following claims.

What is claimed is:

1. An apparatus for producing a solid substance such as silicon by reaction of a precursor gas composition, said apparatus comprising:
    a reaction vessel having interior walls for containing the precursor gas composition;
    gas inlet means for introducing the precursor gas composition into the reaction vessel;
    gas outlet means for permitting excess gas composition and by-product gases to leave the reaction vessel;
    solid substance removal means for permitting at least intermittent removal of the solid substance from the reaction vessel, and
    wall cleaning means supported within the reaction vessel, said cleaning means including at least one rotating, telescopic head and means for ejecting a stream of cleaning gas from said at least one rotating, telescopic head so as to impinge upon the interior walls of the vessel, the impinging cleaning gas stream keeping at least a portion of the surface of the interior walls substantially free of deposits of the solid substance and further acting in combination with the static gas pressure to bias the rotating, telescopic head into close proximity to the interior walls.

2. The apparatus of claim 1 wherein the head incorporates an aperture wherethrough the gas stream is ejected.

3. The apparatus of claim 1 comprising a plurality of telescopic heads, each of said heads ejecting a gas so as to impinge upon the interior walls.

4. The apparatus of claim 1 wherein the head further comprises a member in direct contact with the interior wall, said member comprising means for scraping deposited solid substance off the wall.

5. The apparatus of claim 1 wherein the reaction vessel is a cylindrical hollow body, and the head is rotatable within the interior of the hollow cylindrical body.

6. An apparatus for producing a solid substance such as silicon by reaction of a precursor gas composition, such as by thermal decomposition of silane, said apparatus comprising:
    a reaction vessel having interior walls for containing the gas composition;
    gas inlet means for introducing the gas composition into the reaction vessel;
    gas outlet means for permitting excess gas composition or by-product gases to escape from the reaction vessel;
    solid substance removal means for permitting at least intermittent removal of the solid substance from the reaction vessel, and
    rotatable means including at least one rotating head configured to be substantially complementary to at least a portion of the interior walls for keeping at least a substantial portion of the surface of the interior walls free of solid substance deposited thereon, said rotatable means including a cleaning arm having a telescoping, radially outwardly directed nozzle head located thereon, said rotatable means further employing the pressure of the gas inside the cleaning arm to force the nozzle head close to a portion of the interior wall, said rotatable means further employing gas impinging on the interior wall portion to decrease the pressure within the narrow space between the nozzle and the wall portion, relative to the static pressure within the vessel, thereby maintaining a minimum spacial distance between the nozzle and the wall portion.

7. The apparatus of claim 6 wherein the head further includes a member in contact with the interior wall portion, said member comprising means for scraping the wall portion.

8. The apparatus of claim 6 further comprising means for moving the head in a reciprocating motion in a direction substantially aligned with the longitudinal axis of the cylindrical reaction vessel.

9. The apparatus of claim 6 comprising a plurality of rotating heads with each said rotating head having the aforesaid complementary configuration.

10. The apparatus of claim 9 wherein the cylindrical reaction vessel includes bottom, top and side walls, means for heating at least a portion of said side walls representing said portion of said interior walls, and wherein the rotatable means including the plurality of heads are positioned for keeping substantially the entire heated portion of the interior surface of the side walls substantially free of deposits of the solid substance.

* * * * *